W. B. SPENCER.
MEASURING DEVICE.
APPLICATION FILED AUG. 26, 1909.

981,707.

Patented Jan. 17, 1911.

2 SHEETS—SHEET 1.

Witnesses:
John Enders
Chas. H. Bull.

Inventor:
William B. Spencer
By David H. Fletcher,
Atty.

W. B. SPENCER.
MEASURING DEVICE.
APPLICATION FILED AUG. 26, 1909.

981,707.

Patented Jan. 17, 1911.

2 SHEETS—SHEET 2.

Witnesses:
John Enders
Chas. H. Buell.

Inventor:
William B. Spencer.
By David H. Fletcher,
Atty.

UNITED STATES PATENT OFFICE.

WILLIAM B. SPENCER, OF CHICAGO, ILLINOIS.

MEASURING DEVICE.

981,707.

Specification of Letters Patent.

Patented Jan. 17, 1911.

Application filed August 26, 1909. Serial No. 514,787.

*To all whom it may concern:*

Be it known that I, WILLIAM B. SPENCER, a citizen of the United States, residing at Chicago, in the county of Cook and State of Illinois, have invented certain new and useful Improvements in Measuring Devices, of which the following is a description, reference being had to the accompanying drawings, forming a part of this specification, in which corresponding letters of reference in the different figures indicate like parts.

The primary object of my invention is to provide a measuring device which shall be simple and cheap in construction and operation, and provided with adjustable means whereby it may be adapted to varying measurements so that any predetermined units of weight in articles of varying specific gravity, such, for example, as coffee, tea or rice, may be indicated with accuracy by measurement alone.

A further object is to so construct said device that different articles may be mixed or blended while being measured.

To these ends my invention consists in the combination of elements hereinafter more particularly described and definitely pointed out in the claims.

Figure 1:
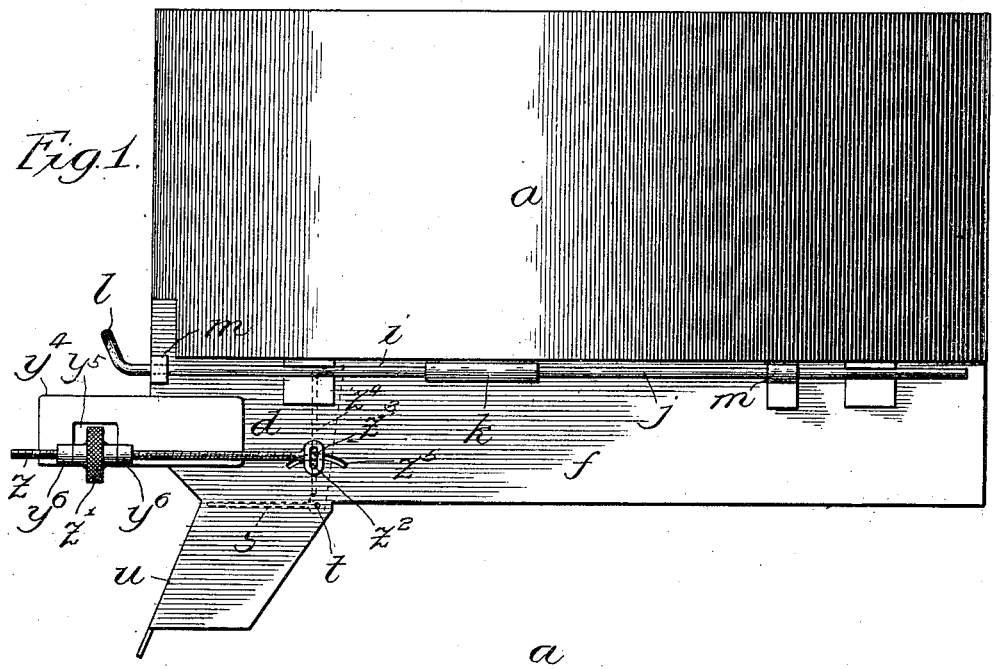
Figure 2:
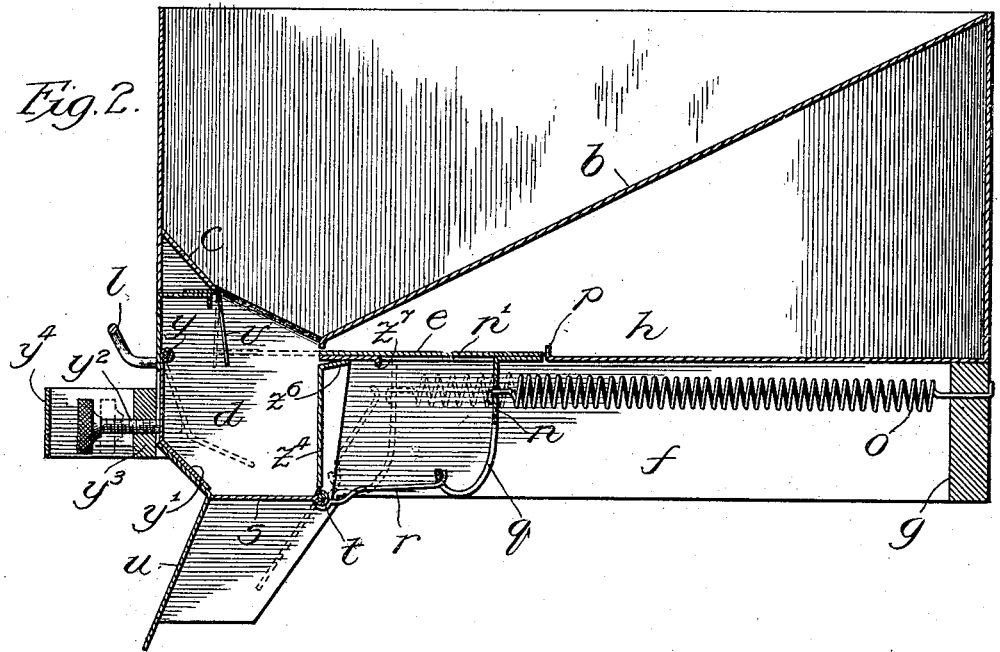
Figure 3:
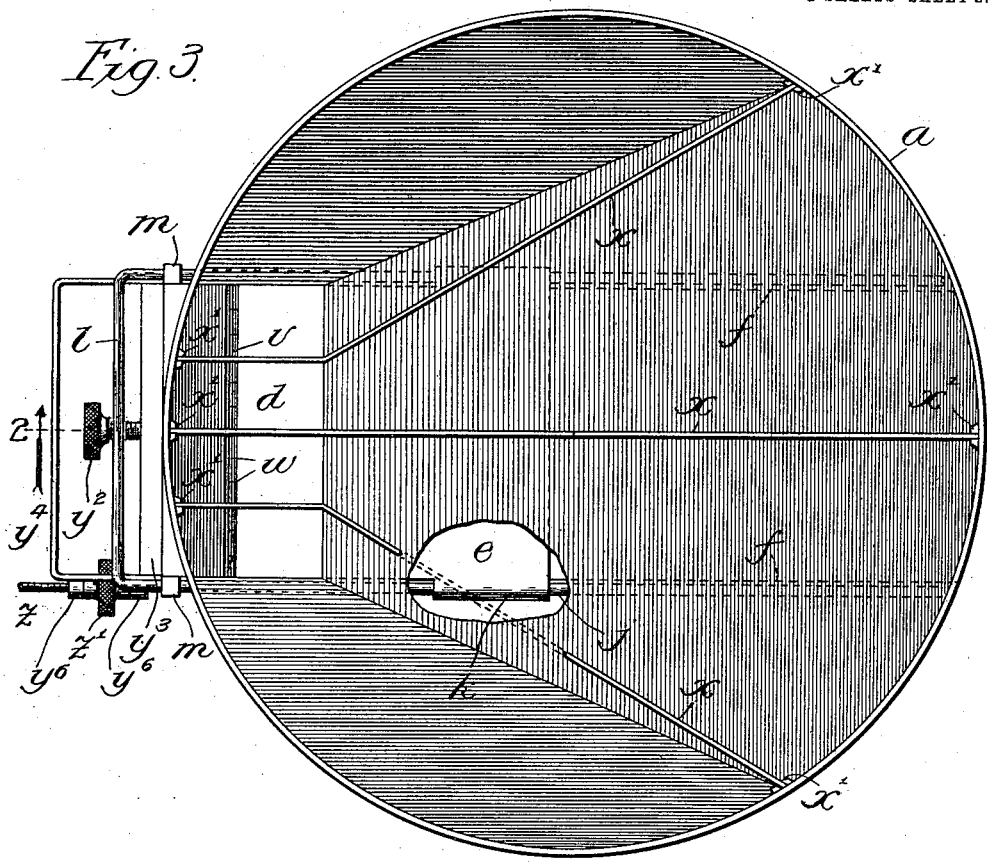
Figure 4:
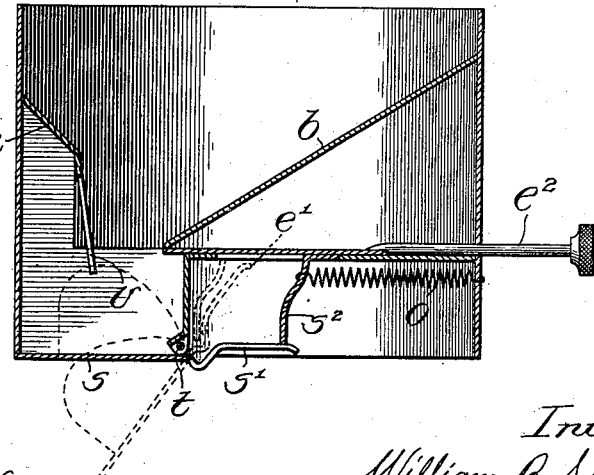

In the drawings—Figure 1 is a side elevation of a device embodying the features of my invention, Fig. 2 is a vertical sectional view taken upon the line 2—, Fig. 3, viewed in the direction of the arrow there shown, Fig. 3 is a plan view, and Fig. 4 is a central vertical sectional view of a modified construction.

Referring to the drawings, $a$ represents a reservoir of any desired capacity, preferably made from sheet metal and cylindrical in form, having inclined portions $b$, $c$, Fig. 2, forming a hopper bottom. A measuring chamber $d$, is formed at the front, of lesser width than the body of the reservoir and directly beneath the throat of the hopper, which is adapted to be closed by means of a sheet-metal slide $e$. Parallel flanges $f$, shown in full lines in Figs. 1 and 2, and indicated in dotted lines in Fig. 3, are extended rearwardly from the measuring chamber, of which their forward portions form the side-walls, and are connected at the rear by means of a wall $g$, of wood. The reservoir is provided with a floor or bottom $h$, which serves as a partial support for the slide $e$, portions of which extend laterally through slots $i$ and are bent around and rigidly attached to rods $j$, $j$ as shown at $k$. Said rods are preferably made integral with a cross-bar $l$, at the front, and are slidably supported in bearings $m$, $m$, at the sides of the base portion. A forwardly bent depending arm $n$, is rigidly attached to the bottom of the slide $e$, and is adapted to be moved back and forth through a slot $n^1$, Fig. 2, in the floor $h$. A coiled spring $o$ serves to hold the slide back in a normal position against a stop $p$. The arm $n$ is provided with a vertical slot $q$ through which is loosely extended a bent arm $r$ rigidly attached to a tilting gate $s$, hinged at $t$. The gate is located within a delivery spout $u$ and forms the bottom of the measuring chamber. The spring $o$ serves to hold the slide $e$ normally open, and by reason of the action of the part $q$ upon the arm $r$, the gate $s$ is held normally closed. I prefer to make the arm $r$ of resilient material, and to so shape it that when the gate $s$ is closed it will be under spring tension. In order to prevent the slide $e$ from crushing articles being measured, as a result of closing said slide as well as to permit said slide to have enough movement after closing the discharge opening from the reservoir to provide for the sudden opening of the tilting gate $s$, and to fully close the latter during the initial backward movement of the gate $e$, before the discharge opening controlled thereby is exposed, I provide a yielding abutment $v$, which consists of an inclined plate formed from thin sheet-metal having more or less of a spring temper, so that it may yield, as indicated in Fig. 2, when the slide is pressed against it and return to its normal position when again released. I prefer to form vertical slits $w$, Fig. 3 therein so that in case a grain of some material is pressed against some one portion that portion may yield with less resistance than would be required to bend the whole plate.

Removable partitions $x$ are supported in vertical guides $x^1$ so that the entire reservoir may be used for one material or a plurality of different compartments all in communication with the measuring receptacle may be employed for mixing different materials, which may be separately placed in each compartment. This feature is especially desirable in blending coffee.

For the purpose of varying the capacity of the measuring chamber for different materials, I provide the following means: Pivoted at $y$, within the front of the measuring chamber, is a movable wall $y^1$, which may be adjusted to any desired position by means of a set-screw $y^2$ tapped into a cross-bar $y^3$. A rigid bail or shield $y^4$ is extended outwardly across the front of the measuring chamber for the purpose hereinafter stated.

Formed in the part $y^4$ is a notch $y^5$ having lugs $y^6$, $y^6$ upon opposite sides thereof through bores in which is passed a screw-threaded rod $z$, having a thumb-nut $z^1$ thereon located between said lugs. The turning of the nut serves to move the rod forward or back. A head upon the rear end of the rod is provided with a slot $z^2$, through which is extended a pin $z^3$ attached to the rear wall $z^4$ of the measuring chamber, said wall being pivotally supported at $t$. A slot $z^5$ in the wall $f$ permits the pin to be moved back and forth. A flange $z^6$ upon the top and side edges of the wall $z^4$ serves to give it strength. A stop $z^7$ is provided for limiting its backward movement. By means of the nut $z^1$ the wall $z^4$ may be adjusted to any desired position.

The operation of said device is as follows: If only one material is placed in the reservoir, I prefer to remove the partitions $x$, although this is not essential. If two materials are to be blended, all of the partitions except the middle one, should be removed, when the materials are placed in adjoining compartments, it being understood, of course, that as many compartments should be provided for as there are separate materials to be mixed. The operator then grasps the bar $l$ and pulls the slide $e$ forward. The bent arm $r$ is so shaped with reference to the arm $q$ that the gate $s$ remains closed until the forward end of the slide $e$ is brought into contact with the part $v$, when the gate $s$ falls and permits the material from the measuring chamber to be delivered. If different materials are stored in the reservoir, it will be found that they will be mixed in the required proportions, which may be varied at will by providing and adjusting the requisite partitions.

In Fig. 4 I have shown a modification of said invention in which the slide $e^1$ is operated from the rear by means of a projecting rod $e^2$. The arm $s^1$ upon the gate $s$ is also slightly modified, as is also the actuating arm $s^2$, the lower end of which is adapted to bear upon the top of the arm $s^1$. The relative position of the two, when the gate $s$ is open, being indicated in dotted lines.

Having thus described my invention, I claim:

1. The combination in a measuring device of a reservoir, a measuring chamber, a normally open sliding gate for closing communication between said reservoir and chamber, a normally closed tilting gate forming the bottom of said measuring chamber, a yielding abutment for engaging the forward end of said sliding gate to permit a given movement of the latter after the space between the two is closed, a bent arm upon said tilting gate, and means arranged to move with said sliding gate for engaging said bent arm to normally hold said tilting gate closed during a predetermined period and release the same during the remaining movement of said sliding gate, after the forward end thereof is in contact with said yielding abutment and to suddenly close said tilting gate before the forward end of said sliding gate shall have separated from said yielding abutment in a reverse movement.

2. The combination of a reservoir, a measuring chamber, a normally open sliding gate for controlling the discharge from the former to the latter, a tilting gate for controlling the discharge from the latter, one of said gates being open while the other is closed, a resilient arm upon said tilting gate for holding the same normally closed, and an arm upon said sliding gate for engaging said resilient arm, the latter being bent close to the axis of the gate to permit the latter to suddenly open after said sliding gate is closed, and cause the same to be suddenly closed during the initial opening movement of said sliding gate, and to be held closed by a resilient pressure when said sliding gate is fully open.

3. The combination with a reservoir and measuring chamber of sliding rods connected at the front of the device to form a handle, a sliding gate supported by said rods for controlling the discharge opening from said reservoir to the measuring chamber, a spring for holding said gate normally open, said gate being arranged to move a predetermined distance after closing said discharge opening, a pivoted gate for controlling the discharge opening of said measuring chamber, a bent arm upon said gate extending rearwardly from its axis, and an arm extending downwardly from said sliding gate to contact with said bent arm, whereby a slight forward or backward movement of the sliding gate when closed may serve to permit said tilting gate to open or cause it to be closed.

In testimony whereof, I have signed this specification in the presence of two subscribing witnesses, this 23d day of August 1909.

WILLIAM B. SPENCER.

Witnesses:
   D. H. FLETCHER,
   CARRIE E. JORDAN.